(12) United States Patent
Verma et al.

(10) Patent No.: US 10,637,764 B2
(45) Date of Patent: Apr. 28, 2020

(54) SYSTEMS AND METHODS FOR FACILITATING TRANSPARENT SERVICE MAPPING ACROSS MULTIPLE NETWORK TRANSPORT OPTIONS

(71) Applicant: Juniper Networks, Inc., Sunnyvale, CA (US)

(72) Inventors: Anshu Verma, San Jose, CA (US); Javier Antich, Valencia (ES)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/967,547

(22) Filed: Apr. 30, 2018

(65) Prior Publication Data
US 2019/0190812 A1    Jun. 20, 2019

(30) Foreign Application Priority Data
Dec. 19, 2017   (EP) .................................... 17382864

(51) Int. Cl.
| | |
|---|---|
| *H04L 12/751* | (2013.01) |
| *H04L 12/46* | (2006.01) |
| *H04L 12/24* | (2006.01) |
| *H04L 12/66* | (2006.01) |
| *H04L 12/723* | (2013.01) |
| *H04L 12/911* | (2013.01) |
| *H04L 12/715* | (2013.01) |
| *H04L 12/713* | (2013.01) |

(52) U.S. Cl.
CPC .......... *H04L 45/02* (2013.01); *H04L 12/4633* (2013.01); *H04L 12/4641* (2013.01); *H04L 12/66* (2013.01); *H04L 41/0823* (2013.01); *H04L 45/50* (2013.01); *H04L 45/507* (2013.01); *H04L 45/64* (2013.01); *H04L 47/781* (2013.01); *H04L 47/825* (2013.01); *H04L 45/586* (2013.01)

(58) Field of Classification Search
CPC . H04L 45/02; H04L 12/4633; H04L 12/4641; H04L 12/66; H04L 12/0823; H04L 45/50; H04L 45/586
USPC ........................................................ 370/254
See application file for complete search history.

(56) References Cited

U.S. PATENT DOCUMENTS

| | | | |
|---|---|---|---|
| 8,880,727 B1 | 11/2014 | Kodeboyina | |
| 9,270,426 B1 | 2/2016 | Atlas et al. | |
| 2002/0067725 A1* | 6/2002 | Oguchi | ............... H04L 12/4641 370/390 |
| 2002/0110087 A1* | 8/2002 | Zelig | ....................... H04L 45/00 370/236 |

(Continued)

*Primary Examiner* — Stephen J Clawson
(74) *Attorney, Agent, or Firm* — FisherBroyles, LLP

(57) ABSTRACT

The disclosed computer-implemented method may include (1) identifying a plurality of network paths within a network, (2) identifying a plurality of network services offered via the network, (3) creating a virtual path topology that represents a select grouping of the network paths that (A) originate from a single ingress node within the network and (B) lead to a plurality of egress nodes within the network, (4) mapping at least one of the network services to the virtual path topology, and (5) providing the at least one of the network services to at least one computing device via at least one of the network paths included in the select grouping represented by the virtual path topology. Various other methods, systems, and computer-readable media are also disclosed.

14 Claims, 13 Drawing Sheets

(56) References Cited

U.S. PATENT DOCUMENTS

| | | | |
|---|---|---|---|
| 2007/0041355 A1* | 2/2007 | Shaw | H04L 12/4633 370/351 |
| 2014/0122683 A1 | 5/2014 | Zhao et al. | |
| 2015/0063166 A1* | 3/2015 | Sif | G06F 9/45558 370/254 |
| 2016/0156513 A1* | 6/2016 | Zhang | H04W 4/70 709/220 |
| 2017/0078153 A1* | 3/2017 | Zhang | H04L 41/12 |
| 2018/0034696 A1* | 2/2018 | Shahriar | G06F 9/45558 |

* cited by examiner

SYSTEMS AND METHODS FOR FACILITATING TRANSPARENT SERVICE MAPPING ACROSS MULTIPLE NETWORK TRANSPORT OPTIONS

BACKGROUND

Networks often implement various communication protocols that control the flow of traffic and/or facilitate the delivery of network services. These communication protocols may represent and/or provide different transport options for such network services. Unfortunately, mapping network services to transport options may be fairly complex, inconsistent, and/or configuration intensive. As a result, traditional mapping solutions may call for expensive network administrators that have vast knowledge of the different transport options to manually perform the necessary configurations on certain network devices.

Such traditional mapping solutions may increase the costs of maintaining and/or operating the networks and/or providing certain network services. Additionally or alternatively, the complexity of such traditional mapping solutions may lead to complications and/or disturbances within the networks, thereby potentially resulting in downtime and/or the suspension of certain network services. The instant disclosure, therefore, identifies and addresses a need for improved systems and methods for facilitating transparent service mapping across multiple network transport options.

SUMMARY

As will be described in greater detail below, the instant disclosure generally relates to systems and methods for facilitating transparent service mapping across multiple network transport options. In one example, a computer-implemented method for facilitating transparent service mapping across multiple network transport options may include (1) identifying a plurality of network paths within a network, (2) identifying a plurality of network services offered via the network, (3) creating a virtual path topology that represents a select grouping of the network paths that (A) originate from a single ingress node within the network and (B) lead to a plurality of egress nodes within the network, (4) mapping at least one of the network services to the virtual path topology, and (5) providing the at least one of the network services to at least one computing device via at least one of the network paths included in the select grouping represented by the virtual path topology.

As another example, a system for implementing the above-described method may include various modules stored in memory. The system may also include at least one physical processor that executes these modules. For example, the system may include (1) an identification module that (A) identifies a plurality of network paths within a network and (B) identifies a plurality of network services offered via the network, (2) a creation module that creates a virtual path topology that represents a select grouping of the network paths that (A) originate from a single ingress node within the network and (B) lead to a plurality of egress nodes within the network, (3) a mapping module that maps at least one of the network services to the virtual path topology, and (4) a provisioning module that provides the at least one of the network services to at least one computing device via at least one of the network paths included in the select grouping represented by the virtual path topology.

As a further example, the above-described method may be encoded as computer-readable instructions on a non-transitory computer-readable medium. For example, a computer-readable medium may include one or more computer-executable instructions that, when executed by at least one processor of a computing device, cause the computing device to (1) identify a plurality of network paths within a network, (2) identify a plurality of network services offered via the network, (3) create a virtual path topology that represents a select grouping of the network paths that (A) originate from a single ingress node within the network and (B) lead to a plurality of egress nodes within the network, (4) map at least one of the network services to the virtual path topology, and (5) provide the at least one of the network services to at least one computing device via at least one of the network paths included in the select grouping represented by the virtual path topology.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
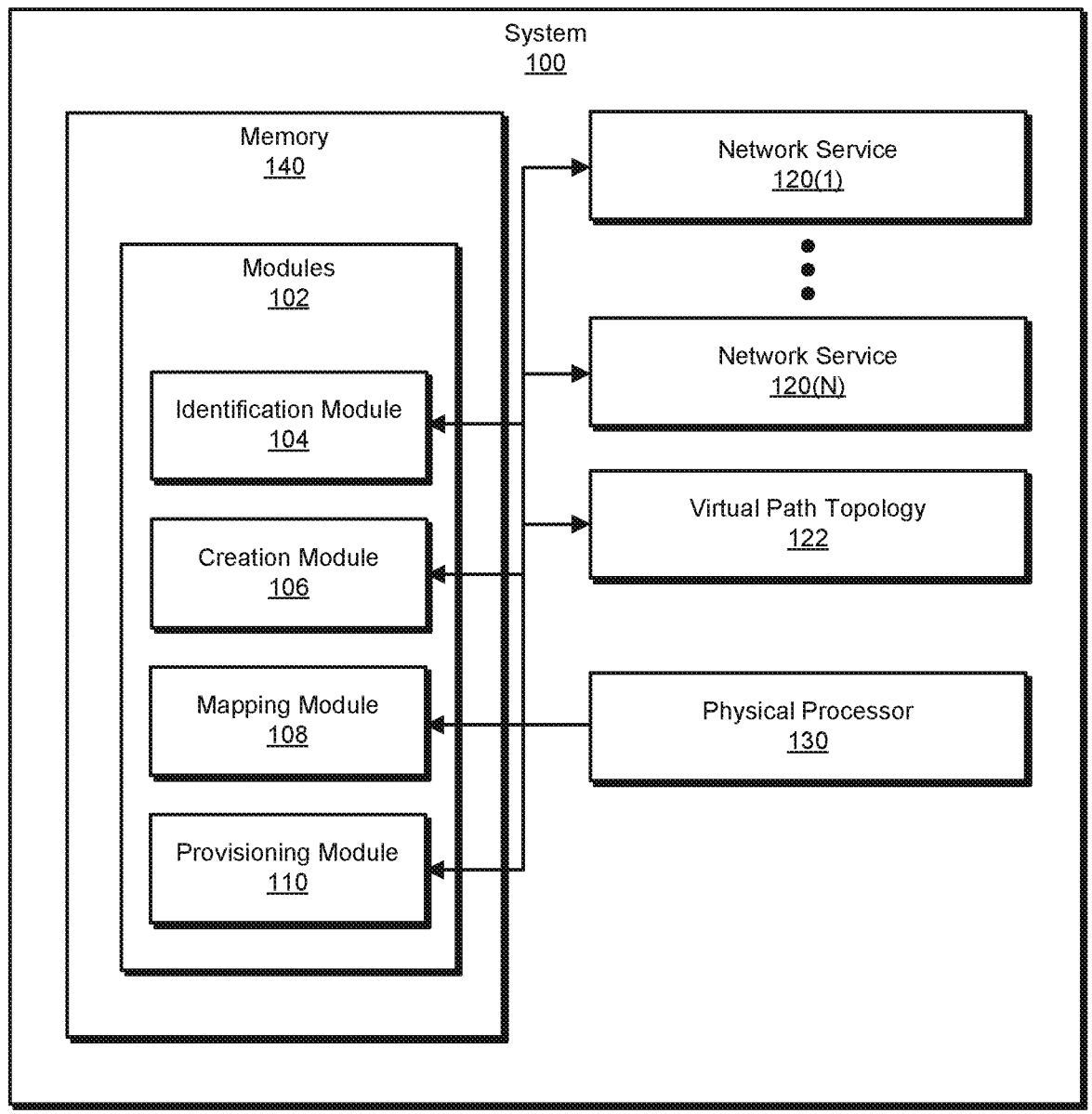
FIG. 1 is a block diagram of an exemplary system for facilitating transparent service mapping across multiple network transport options.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for facilitating transparent service mapping across multiple network transport options. As will be explained in greater detail below, embodiments of the instant disclosure may simplify the complexity of mapping network services to transport options. Additionally or alternatively, embodiments of the instant disclosure may genericize the transport logic with respect to the network services. By doing so, these embodiments may essentially abstract some of the intricacies, inner-workings, and/or differences from the network configuration. As a result, these embodiments may mitigate and/or reduce the configuration and/or maintenance needs of the network, thereby potentially making them less intensive than those of traditional networks.

For example, while traditional mapping solutions may have called for expensive network administrators that have vast knowledge of the different transport option, these embodiments may enable someone with far less knowledge and/or ability to transparently map network services across multiple network transport options. Accordingly, these embodiments may decrease the costs of maintaining and/or operating such networks and/or providing certain network services. Additionally or alternatively, by simplifying the configuration and/or maintenance needs of the networks, these embodiments may mitigate and/or reduce complications and/or disturbances within the networks, thereby potentially decreasing downtime and/or the suspension of certain network services.

Figure 2:
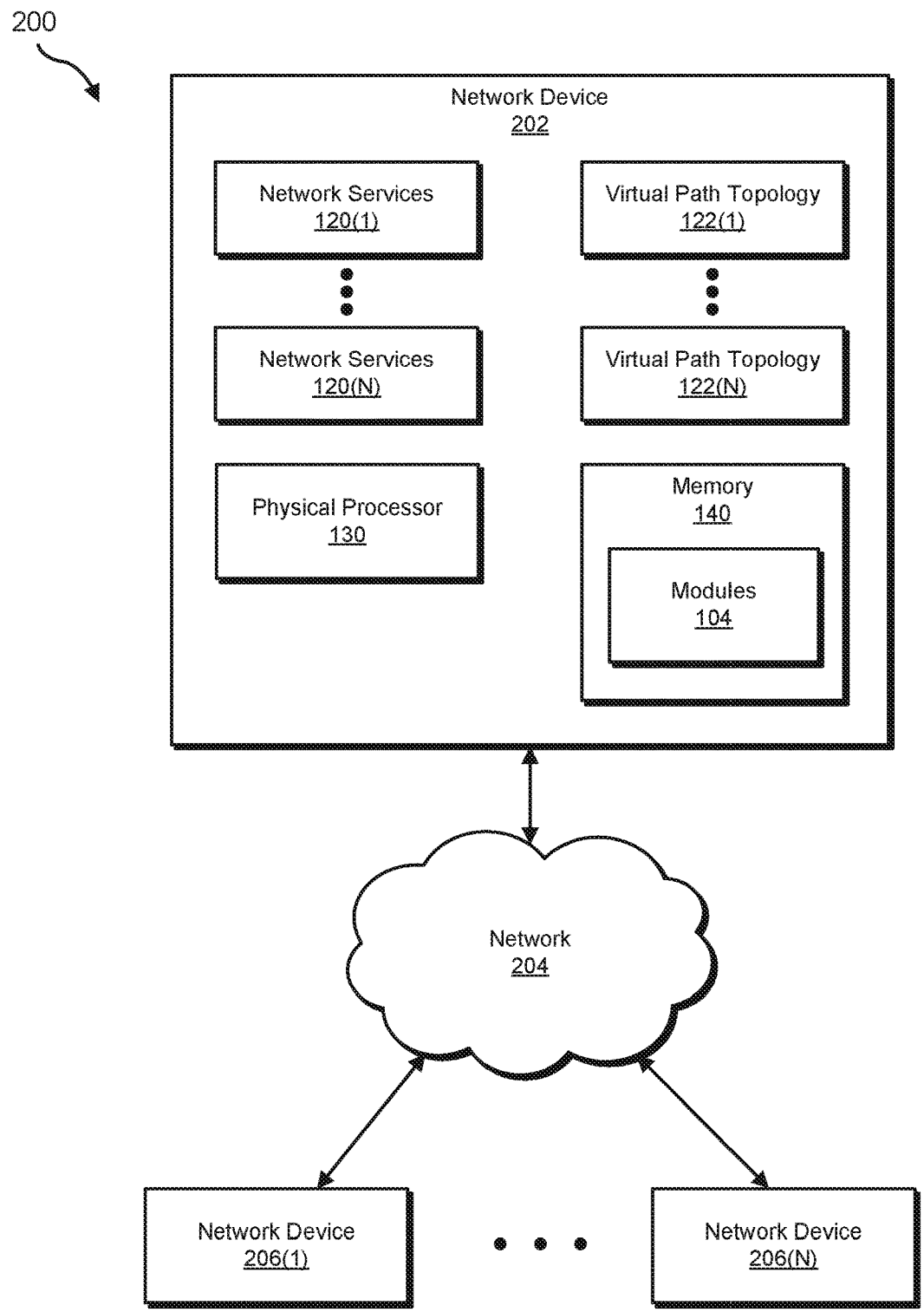
FIG. 2 is a block diagram of an additional exemplary system for facilitating transparent service mapping across multiple network transport options.
Figure 3:
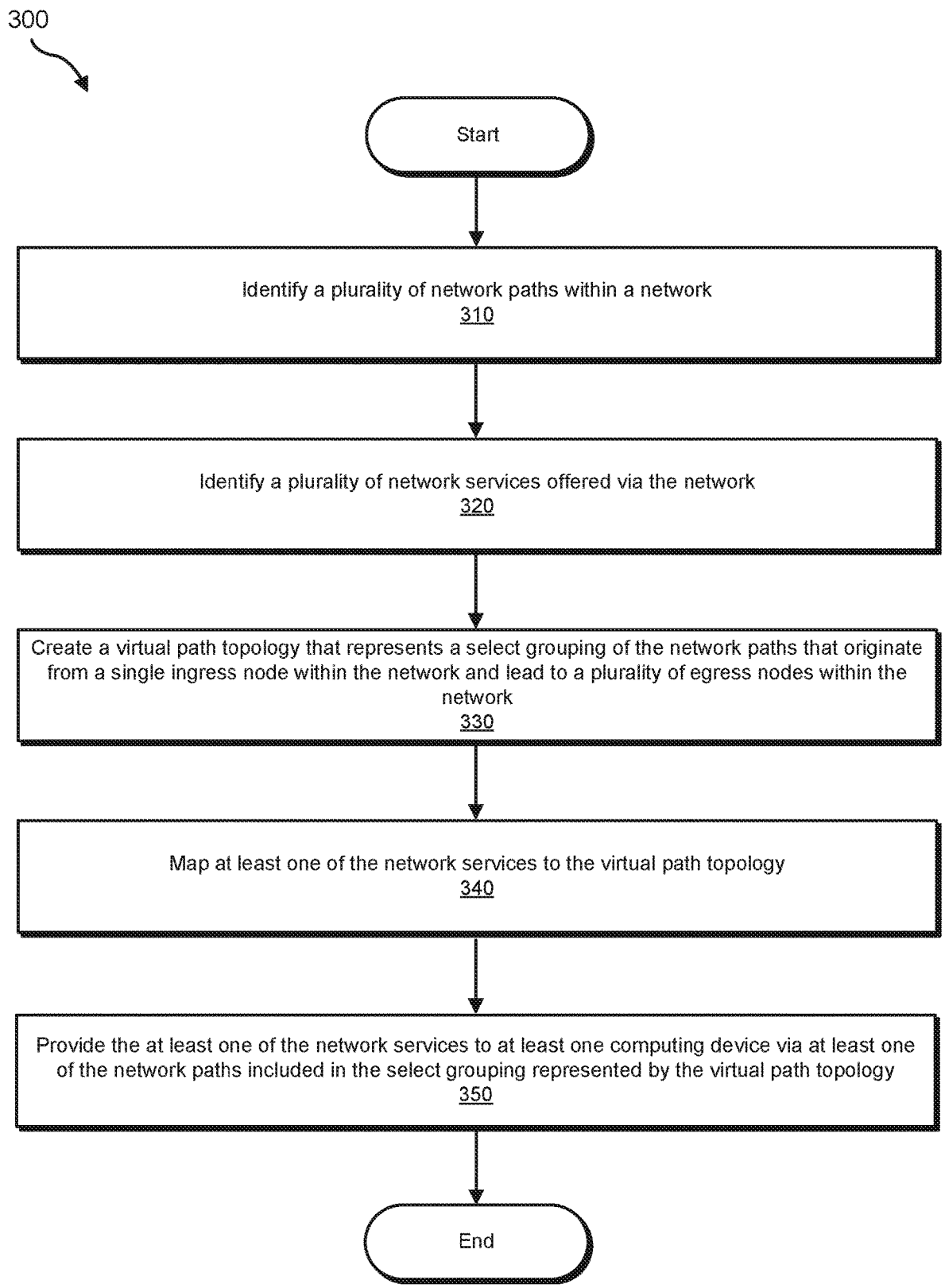
FIG. 3 is a flow diagram of an exemplary method for facilitating transparent service mapping across multiple network transport options.
Figure 4:
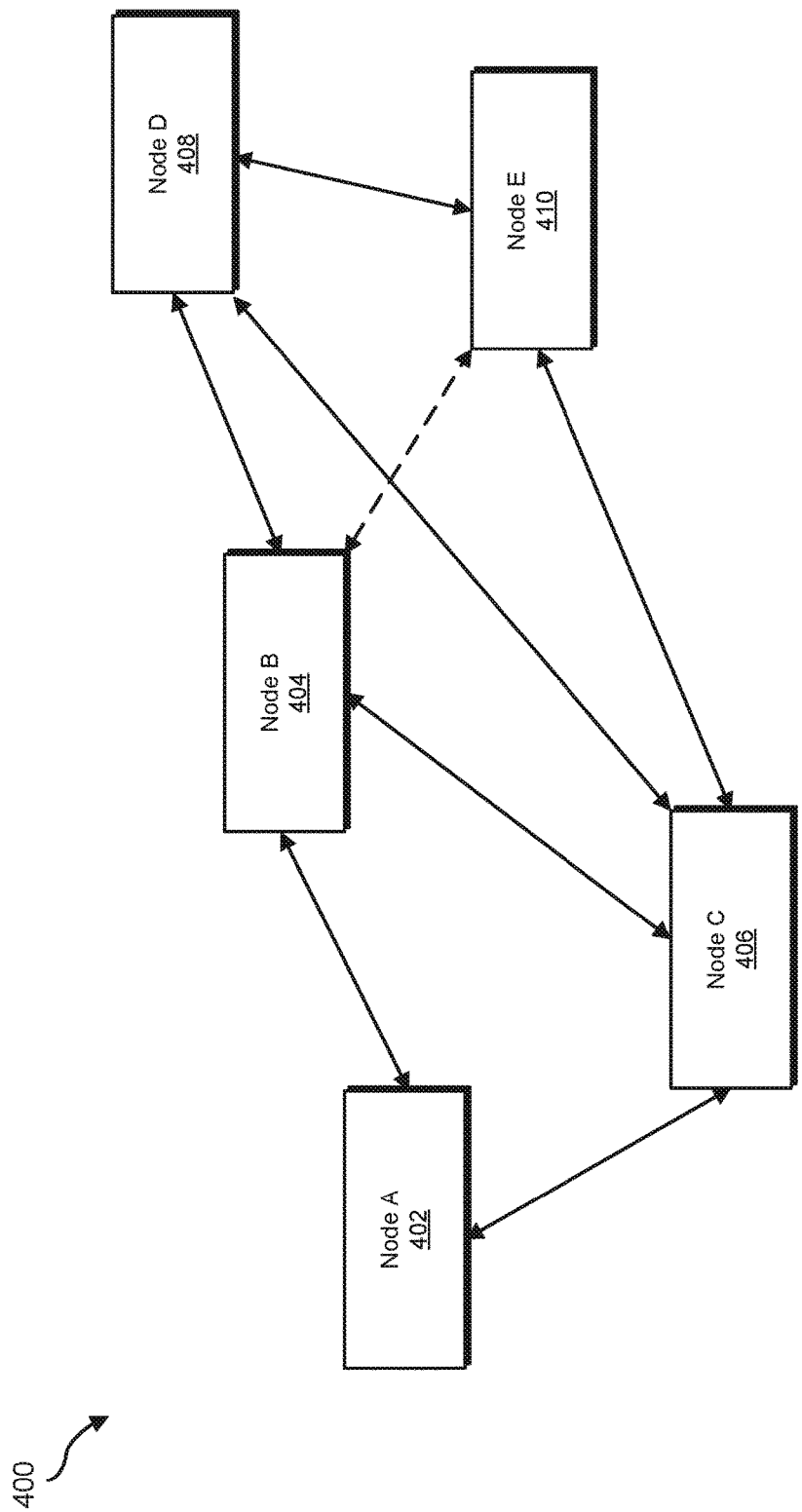
FIG. 4 is a block diagram of an exemplary network that facilitates transparent service mapping across multiple network transport options.

The following will provide, with reference to FIGS. 1, 2, and 4, detailed descriptions of exemplary systems for facilitating transparent service mapping across multiple network transport options. Detailed descriptions of corresponding computer-implemented methods will be provided in connection with FIG. 3. Detailed descriptions of exemplary implementations of service mappings will be provided in connection with FIGS. 5-12. Finally, detailed descriptions of an exemplary computing system will be provided in connection with FIG. 13.

FIG. 1 is a block diagram of an exemplary system 100 for facilitating transparent service mapping across multiple network transport options. As illustrated in this figure, exemplary system 100 may include one or more modules 102 for performing one or more tasks. As will be explained in greater detail below, modules 102 may include an identification module 104, a creation module 106, a mapping module 108, and a provisioning module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., network devices 202 and 206(1)-(N)). One or more of modules 102 in FIG. 1 may also represent all or portions of one or more special-purpose computers configured to perform one or more tasks.

As illustrated in FIG. 1, system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate transparent service mapping across multiple network transport options. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may also include one or more network services, such as network services 120(1)-(N). Network services 120(1)-(N) each generally represent any application implemented via a client-server and/or peer-to-peer architecture or relationship within a network and/or across networks. Examples of network services 120(1)-(N) include, without limitation, Layer 2 (L2) circuits, Layer 3 (L3) Virtual Private Networks (VPNs), L2 VPNs, Virtual Private Local area Services (VPLSes), Ethernet VPNs (EVPNs), Next-Generation Multicast VPNs (NG MVPNs), variations or combinations of one or more of the same, and/or any other suitable network services.

As illustrated in FIG. 1, exemplary system 100 may also include one or more virtual path topologies, such as virtual path topology 122. Virtual path topology 122 generally represents any grouping of network paths that originate from a single ingress node and lead to multiple egress nodes. In one example, virtual path topology 122 may include and/or represent a collection of Label-Switched Paths (LSPs), tunnels, and/or transport options within a network. In this example, virtual path topology 122 may implement and/or utilize one or more communication protocols. Examples of such communication protocols include, without limitation, Resource Reservation Protocol (RSVP), RSVP—Traffic Engineering (TE), Label Distribution Protocol (LDP), Segment Routing Interior Gateway Protocol (SR IGP), Segment Routing Traffic Engineering (SRTE), Generic Routing Encapsulation (GRE), Internet Protocol Security (IPSec), Virtual Extensiable Local Area Network (VxLAN), Border Gateway Protocol Labeled Unicast (BGP LU), Source Packet Routing in Networking (SPRING), Internet Protocol (IP), variations or combinations of one or more of the same, and/or any other suitable protocols.

Exemplary system 100 in FIG. 1 may be implemented in a variety of ways. For example, all or a portion of exemplary system 100 may represent portions of exemplary system 200 in FIG. 2. As shown in FIG. 2, system 200 may include network devices 202 and 206(1)-(N) in communication with one another via a network 204. In one example, all or a portion of the functionality of modules 102 may be performed by network device 202, network devices 206(1)-(N), and/or any other suitable computing system. As will be described in greater detail below, one or more of modules 102 from FIG. 1 may, when executed by at least one processor of network device 202 and/or network devices 206(1)-(N), enable network device 202 and/or network devices 206(1)-(N) to facilitate transparent service mapping across multiple network transport options.

Network devices 202 and 206(1)-(N) each generally represent any type or form of physical computing device that forwards traffic within a network and/or across networks. In one example, one or more of network devices 202 and 206(1)-(N) may include and/or represent a router, such as a Customer Edge (CE) router, a Provider Edge (PE) router, a hub router, a spoke router, an Autonomous System (AS) boundary router, and/or an area border router. Additional examples of network devices 202 and 206(1)-(N) include, without limitation, switches, hubs, modems, bridges, repeaters, gateways, network racks and/or chassis, client devices, laptops, tablets, desktops, servers, cellular phones, Personal Digital Assistants (PDAs), multimedia players, embedded systems, wearable devices (e.g., smart watches, smart glasses, etc.), gaming consoles, portions of one or more of the same, combinations or variations of one or more of the same, and/or any other suitable network devices. Although FIG. 2 illustrates only three network devices, other embodiments may involve and/or incorporate various additional network devices and/or computing devices. The terms "node" and "network device," as used herein, may represent synonyms that are used interchangeably through the instant disclosure.

Network 204 generally represents any medium or architecture capable of facilitating communication or data transfer. In one example, network 204 may facilitate communication among network devices 202 and 206(1)-(N). In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network. Although network devices 202 and 206(1)-(N) are illustrated as being external to network 204 in FIG. 2, these devices may alternatively represent part of and/or be included in network 204.

FIG. 3 is a flow diagram of an exemplary computer-implemented method 300 for performing in-service software upgrades on active network devices. The steps shown in FIG. 3 may be performed by any suitable computer-executable code, computing system, and/or ASIC, including system 100 in FIG. 1, system 200 in FIG. 2, network device 202 in FIG. 4, routing engine 404(1) in FIG. 5, system 600 in FIG. 6, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may identify a plurality of network paths within a network. For example, identification module 104 may, as part of network device 202 in FIG. 2, identify various network paths within network 204. The term "network path," as used herein, generally refers to any series of links and/or devices that facilitate communication and/or the flow of traffic between a source and a destination within a network and/or across networks. In some examples, these network paths may include and/or represent LSPs established by one or more of network devices 202 and 206(1)-(N). Additionally or alternatively, these network paths may be represented by one or more labels and/or transport-level routes or tunnels (such as RSVP tunnels, RSVP—TE tunnels, LDP tunnels, SR IGP tunnels, SRTE tunnels, GRE tunnels, IPSec tunnels, VxLAN tunnels, BGP LU tunnels, SPRING tunnels, IP tunnels, Multi-Protocol Label Switching (MPLS) tunnels, etc.).

The systems described herein may perform step 310 in a variety of different ways and/or contexts. In some examples, identification module 104 may identify the network paths upon establishing and/or creating the same. For example, network device 202 may establish and/or create LSPs that lead to network devices 206(1)-(N) via network 204. In this example, identification module 104 may identify those LSPs as they are established and/or created. Network device 202 may represent the ingress node of the LSPs.

In other examples, identification module 104 may identify the network paths as network device 202 sends or receives communications via such network paths. For example, network device 202 may send or receive a communication via an LSP that leads to network device 206(1). In this example, identification module 104 may identify that LSP as the communication is sent or received via network 204.

Returning to FIG. 3, at step 320 one or more of the systems described herein may identify a plurality of network services offered via the network. For example, identification module 104 may, as part of network device 202 in FIG. 2, identify network services 120(1)-(N) offered via network 204. In this example, network services 120(1)-(N) may be delivered to one or more of network devices 206(1)-(N) via network 204. Additionally or alternatively, network services 120(1)-(N) may be delivered to one or more computing devices not illustrated in FIG. 2. Moreover, network services 120(1)-(N) may originate from and/or be provided by network device 202 and/or network devices 206(1)-(N).

The systems described herein may perform step 320 in a variety of different ways and/or contexts. In some examples, identification module 104 may identify network services 120(1)-(N) as they are installed and/or made available within, through, and/or across network 204. For example, identification module 104 may monitor network device 202 for additional and/or new network services. While monitoring network device 202 in this way, identification module 104 may identify one or more of network services 120(1)-(N) as having been recently installed and/or made available for delivery via network 204.

In other examples, identification module 104 may identify network services 120(1)-(N) as they are executed and/or running within, through, and/or across network 204. For example, identification module 104 may monitor network device 202 for network services that are executed and/or running on or through network device 202. While monitoring network device 202 in this way, identification module 104 may identify one or more of network services 120(1)-(N) as being executed and/or running on or through network device 202.

Returning to FIG. 3, at step 330 one or more of the systems described herein may create a virtual path topology that represents a select grouping of the network paths that originate from a single ingress node and lead to multiple egress nodes within the network. For example, creation module 106 may create virtual path topology 122(1), which represents a select grouping of network paths. In this example, the network paths included in virtual path topology 122(1) may each originate from network device 202 and lead to one of network devices 206(1)-(N) via network 204.

The terms "egress" and "egress node," as used herein, generally refer to any network device that represents the final hop and/or destination of a network path or LSP. The terms "ingress" and "ingress node," as used herein, generally refer to any network device that represents the source at which a network path or LSP begins and/or originates.

The systems described herein may perform step 330 in a variety of different ways and/or contexts. In some examples, creation module 106 may form virtual path topology 122(1) by selecting certain network paths. In one example, the selection of such network paths may be made based at least in part on user input. For example, a network administrator may direct network device 202 via a user interface to select specific network paths for virtual path topology 122(1). In this example, creation module 106 may create and/or form virtual path topology 122(1) based at least in part on the direction from the network administrator.

In another example, the selection of such network paths may be made based at least in part on a certain routing algorithm. For example, network device 202 may implement a routing algorithm that groups certain network paths together to form various virtual path topologies. Alternatively, network device 202 may implement a randomness generator that groups certain network paths together to form various virtual path topologies. As will be described in greater detail below, network device 202 may map certain network services to those virtual path topologies.

In some examples, virtual path topology 122(1) may include, represent, and/or implement a certain type of tunnel. The term "tunnel," as used herein, generally refers to any type or form of virtualization and/or abstraction of a network path encapsulated by a network and/or tunneling protocol. Examples of such a tunnel include, without limitation, RSVP tunnels, RSVP—TE tunnels, LDP tunnels, SR IGP tunnels, SRTE tunnels, GRE tunnels, IPSec tunnels, VxLAN tunnels, BGP LU tunnels, SPRING tunnels, IP tunnels, MPLS tunnels, variations or combinations of one or more of the same, and/or any other suitable tunnel.

In some examples, creation module 106 may create one or more additional virtual path topologies, such as virtual path topologies 122(1)-(N) in FIG. 2. In such examples, virtual path topologies 122(1)-(N) may each represent a select grouping of network paths. The network paths included in virtual path topologies 122(1)-(N) may each originate from network device 202 and lead to one of network devices 206(1)-(N) via network 204. The select grouping of network paths included in virtual path topology 122(N) may differ from those included in virtual path topology 122(1).

Returning to FIG. 3, at step 340 one or more of the systems described herein may map at least one of the network services to the virtual path topology. For example, mapping module 108 may map one or more of network services 120(1)-(N) to virtual path topology 122(1). Upon completion of the mapping, those network services may be provided to one or more computing devices via the network paths included in the select grouping represented by virtual path topology 122(1).

By doing so, mapping module 108 may simplify the complexity of mapping network services to transport options. Additionally or alternatively, mapping module 108 may genericize the transport logic with respect to the network services. For example, mapping module 108 may essentially abstract some of the intricacies, inner-workings, and/or differences from the network configuration. As a result, mapping module 108 may mitigate and/or reduce the configuration and/or maintenance needs of the network, thereby potentially making them less intensive than those of traditional networks.

For example, while traditional mapping solutions may have called for expensive network administrators that have vast knowledge of the different transport options, mapping module 108 may enable someone with far less knowledge and/or ability to transparently map network services across multiple network transport options. Accordingly, mapping module 108 (along with the other modules 102) may decrease the costs of maintaining and/or operating networks and/or providing certain network services. Additionally or alternatively, by simplifying the configuration and/or maintenance needs of the networks, mapping module 108 (along with the other modules 102) may mitigate and/or reduce complications and/or disturbances within the networks, thereby potentially decreasing downtime and/or the suspension of certain network services.

The systems described herein may perform step 340 in a variety of different ways and/or contexts. In some examples, mapping module 108 may facilitate and/or provide a many-to-many (N:N) mapping of network services 120(1)-(N) to virtual path topologies 122(1)-(N). For example, mapping module 108 may map network service 120(1) to both virtual path topology 122(1) and virtual path topology 122(N). Additionally or alternatively, mapping module 108 may map network service 120(N) to both virtual path topology 122(1) and virtual path topology 122(N).

In other examples, mapping module 108 may facilitate and/or provide a one-to-many (1:N) mapping of network services 120(1)-(N) to virtual path topologies 122(1)-(N). For example, mapping module 108 may map both network service 120(1) and network service 120(N) to virtual path topology 122(1). Additionally or alternatively, mapping module 108 may map both network service 120(1) and network service 120(N) to virtual path topology 122(N).

In some examples, creation module 106 may create and/or instantiate a Virtual Routing and Forwarding (VRF) instance. In one example, the VRF instance may implement and/or incorporate virtual path topology 122(1) as the primary and/or preferred routing option. In this example, the VRF instance may implement and/or incorporate virtual path topology 122(N) as the secondary, backup, and/or alternative routing option. This VRF instance may represent the mapping of network services to virtual path topologies. Additionally or alternatively, this VRF instance may define the mapping and/or transport logic between the network services and the virtual path topologies.

Returning to FIG. 3, at step 350 one or more of the systems described herein may provide the at least one of the network services to at least one computing device via at least one of the network paths included in the select grouping represented by the virtual path topology. For example, provisioning module 110 may provide one or more of network services 120(1)-(N) to at least one computing device (not necessarily illustrated in FIG. 2) via one or more of the network paths included in the select grouping represented by virtual path topology 122(1).

The systems described herein may perform step 350 in a variety of different ways and/or contexts. In some examples, provisioning module 110 may direct network device 202 to deliver the mapped service to the corresponding computing device via network 204 and/or one or more of network devices 206(1)-(N). In one example, provisioning module 110 may deliver the mapped service to the corresponding computing device by way of virtual path topology 122(1). For example, as the primary or preferred routing option, virtual path topology 122(1) may facilitate and/or carry the mapped service to the corresponding computing device unless virtual path topology 122(1) has gone down and/or suffered or experienced some sort of technical failure. In the event that virtual path topology 122(1) has gone down and/or suffered or experienced such a failure, virtual path topology 122(N) may, as the secondary or backup routing option, facilitate and/or carry the mapped service to the corresponding computing device. Accordingly, provisioning module 110 may resolve the mapped service through multiple tunnels in accordance with the corresponding primary and/or backup designations. Additionally or alternatively, the mapping may provide transport-level redundancy within virtual path topology 122(1).

Figure 5:
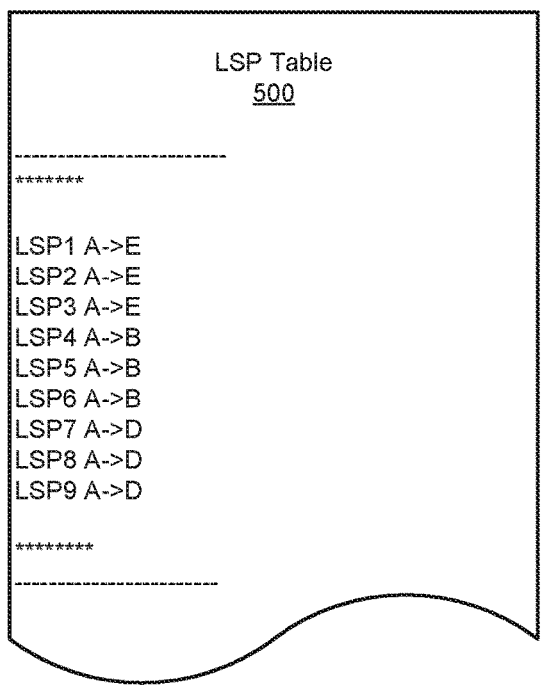
FIG. 5 is an illustration of an LSP table and virtual path topologies.
Figure 5:
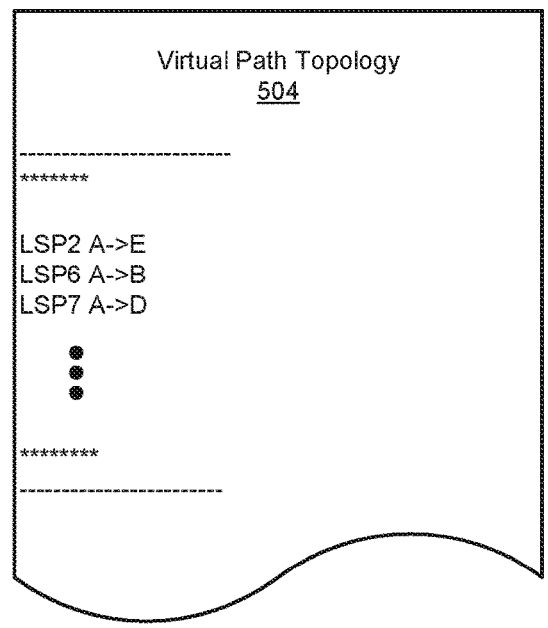
Figure 5:
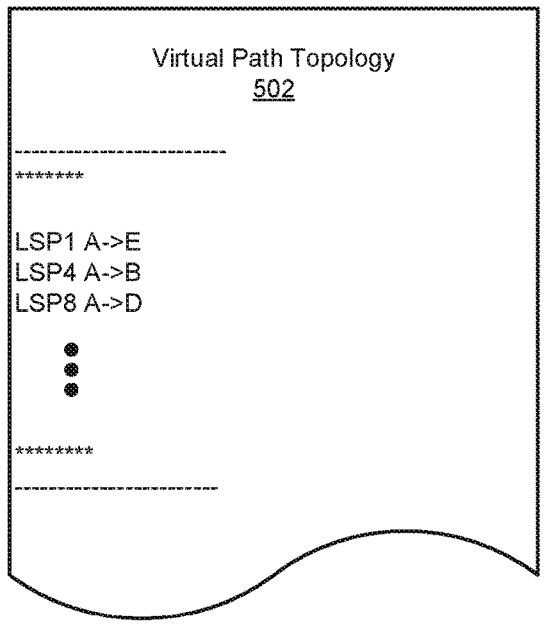
Figure 5:
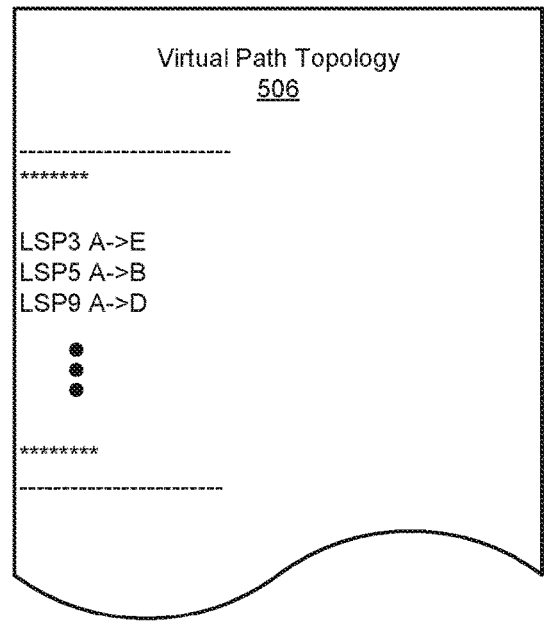

FIGS. 4-12 illustrate exemplary use cases of systems and methods for facilitating transparent service mapping across multiple network transport options. FIG. 4 illustrates an exemplary network 400 that includes and/or represents node A 402, node B 404, node C 406, node D 408, and node E 410. FIG. 5 illustrates an exemplary LSP table 500 and exemplary virtual path topologies 502, 504, and 506. As illustrated in FIG. 5, LSP table 500 may identify and/or include various LSPs that each originate from node A 402 and lead to node B 404, node C 406, node D 408, or node E 410 (in this example, "LSP1 A->E," "LSP2 A->E," "LSP3 A->E," "LSP4 A->B," "LSP5 A->B," "LSP6 A->B," "LSP7 A->D," "LSP8 A->D," and "LSP9 A->D").

In this example, virtual path topology 502 may identify and/or include various LSPs originating from node A 402 (in this example, "LSP1 A->E," "LSP4 A->B," and "LSP8 A->D"). Similarly, virtual path topology 504 may identify and/or include various LSPs originating from node A 402 (in this example, "LSP2 A->E," "LSP6 A->B," and "LSP7 A->D"). In addition, virtual path topology 506 may identify and/or include various LSPs originating from node A 402 (in this example, "LSP3 A->E," "LSP5 A->B," and "LSP9 A->D").

Figure 6:
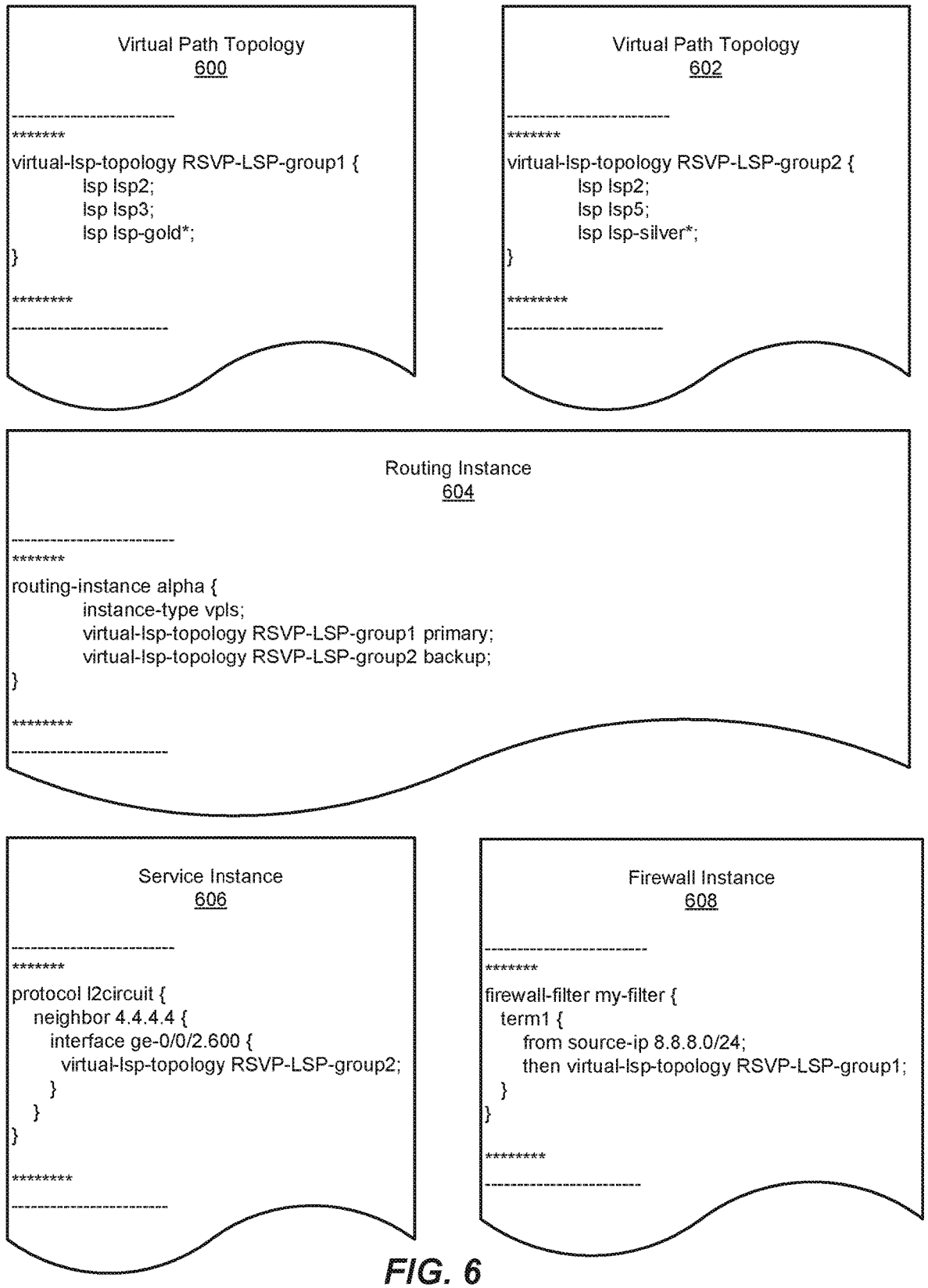
FIG. 6 is an illustration of an exemplary implementation of a service mapping.

FIG. 6 illustrates an exemplary implementation of a service mapping using RSVP technology. As illustrated in FIG. 6, this exemplary implementation may include and/or represent virtual path topologies 600 and 602, a routing instance 604, a service instance 606, and a firewall instance 608. In this example, virtual path topology 600 may include and/or represent a select grouping of LSPs (in this example, "Isp Isp2", "Isp Isp3," and "Isp Isp-gold*"). Similarly, virtual path topology 602 may include and/or represent a different select grouping of LSPs (in this example, "Isp Isp2", "Isp Isp5," and "Isp Isp-silver").

As illustrated in FIG. 6, routing instance 604 may instantiate a specific mapping (in this example, "routing-instance alpha") that defines the corresponding service type (in this example, "instance-type vpls"), the primary routing and/or tunneling option (in this example, "virtual-Isp-topology RSVP-LSP-group1 primary"), and/or the backup routing and/or tunneling option (in this example, "virtual-Isp-topology RSVP-LSP-group2 backup"). Service instance 606 may instantiate a specific service (in this example, "protocol l2circuit") in connection with a certain neighbor (in this example, "neighbor 4.4.4.4"), a certain interface (in this example, "interface ge-0/0/2.600"), and/or a certain virtual path topology (in this example, "virtual-Isp-topology RSVP-LSP-group2 "). Firewall instance 608 may instantiate a firewall filter (in this example, "firewall-filter my-filter") for traffic and/or services that meet certain conditions and/or have certain attributes (in this example, "from source-ip 8.8.8.0/24" and "then virtual-Isp-topology RSVP-LSP-group1").

Figure 7:
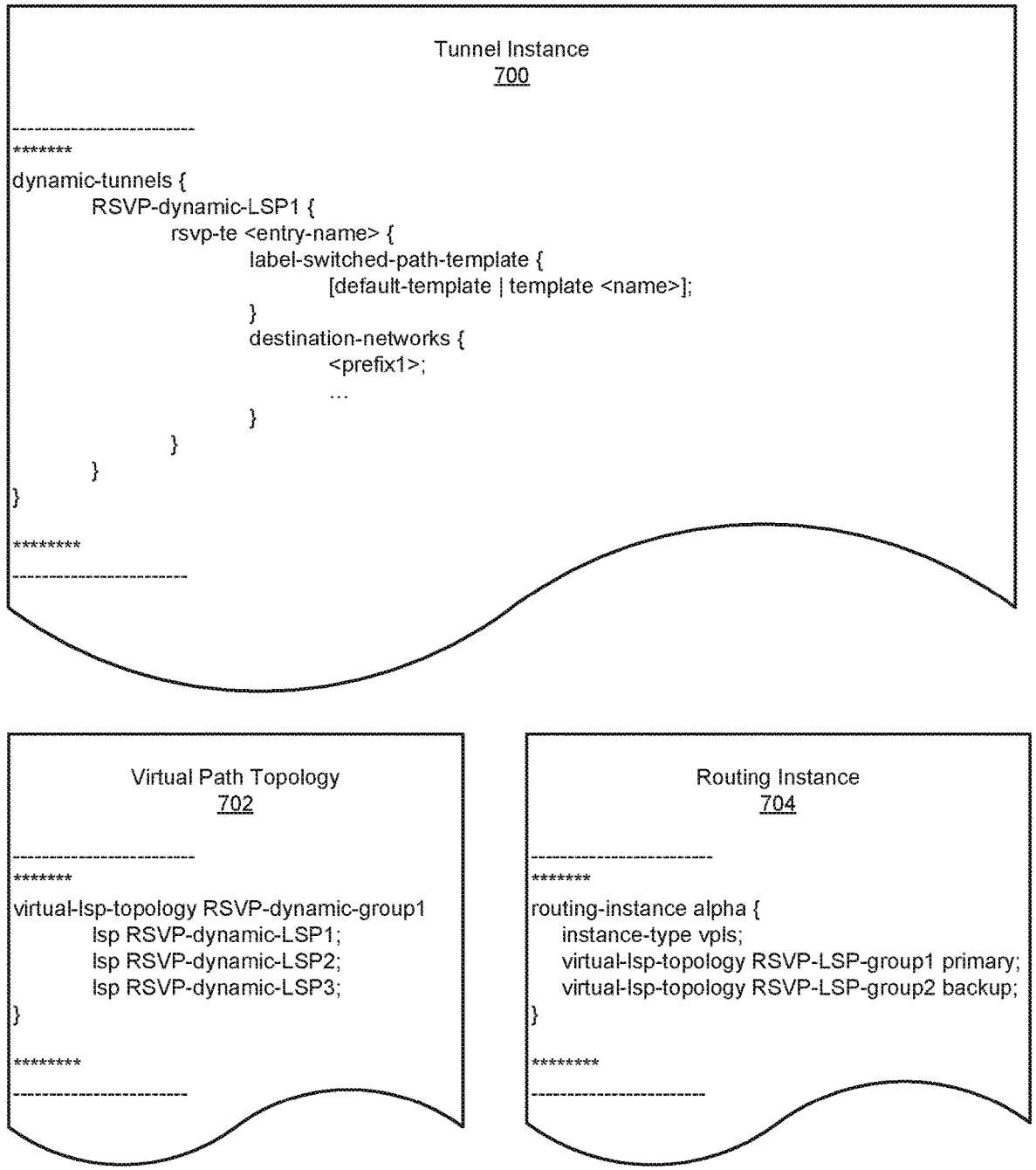
FIG. 7 is an illustration of an exemplary implementation of an additional service mapping.

FIG. 7 illustrates an exemplary implementation of a service mapping using dynamic RSVP technology. As illustrated in FIG. 7, this exemplary implementation may include and/or represent a tunnel instance 700, a virtual path topology 702, and a routing instance 704. In this example, tunnel instance 700 may instantiate a specific tunnel (in this example, "dynamic-tunnels") that implements RSVP technology. Virtual path topology 702 may include and/or represent a select grouping of LSPs (in this example, "Isp RSVP-dynamic-LSP1", "Isp RSVP-dynamic-LSP2," and "Isp RSVP-dynamic-LSP3"). Similarly, routing instance 704 may instantiate a specific mapping (in this example, "routing-instance alpha") that defines the corresponding service type (in this example, "instance-type vpls"), the primary routing and/or tunneling option (in this example, "virtual-Isp-topology RSVP-LSP-group1 primary"), and/or the backup routing and/or tunneling option (in this example, "virtual-Isp-topology RSVP-LSP-group2 backup").

Figure 8:
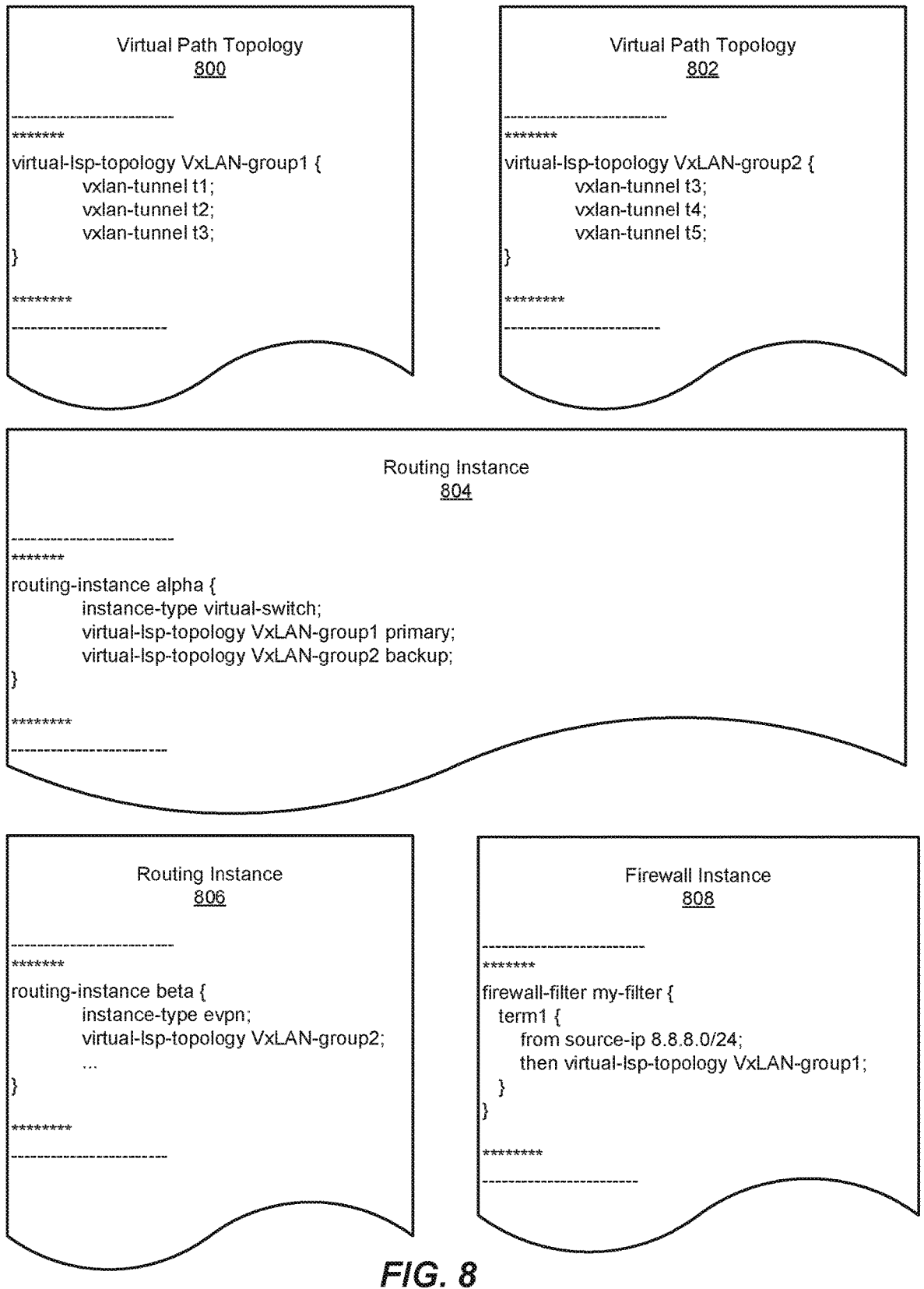
FIG. 8 is an illustration of an exemplary implementation of an additional service mapping.

FIG. 8 illustrates an exemplary implementation of a service mapping using VxLAN technology. As illustrated in FIG. 8, this exemplary implementation may include and/or represent virtual path topologies 800 and 802, routing instances 804 and 806, and a firewall instance 808. In this example, virtual path topology 800 may include and/or represent a select grouping of VxLAN tunnels (in this example, "vxlan-tunnel t1", "vxlan-tunnel t2," and "vxlan-tunnel t3"). Similarly, virtual path topology 802 may include and/or represent a different select grouping of LSPs (in this example, "vxlan-tunnel t3", "vxlan-tunnel t4," and "vxlan-tunnel t5").

As illustrated in FIG. 8, routing instance 804 may instantiate a specific mapping (in this example, "routing-instance alpha") that defines the corresponding service type (in this example, "instance-type virtual-switch"), the primary routing and/or tunneling option (in this example, "virtual-Isp-topology VxLAN-group1 primary"), and/or the backup routing and/or tunneling option (in this example, "virtual-Isp-topology VxLAN-group2 backup"). Routing instance 806 may instantiate a specific mapping (in this example, "routing-instance beta") that defines the corresponding service type (in this example, "instance-type evpn") and the corresponding routing and/or tunneling option (in this example, "virtual-Isp-topology VxLAN-group 2"). Firewall instance 808 may instantiate a firewall filter (in this example, "firewall-filter my-filter") for traffic and/or services that meet certain conditions and/or attributes (in this example, "from source-ip 8.8.8.0/24" and "then virtual-Isp-topology VxLAN-group1").

Figure 9:
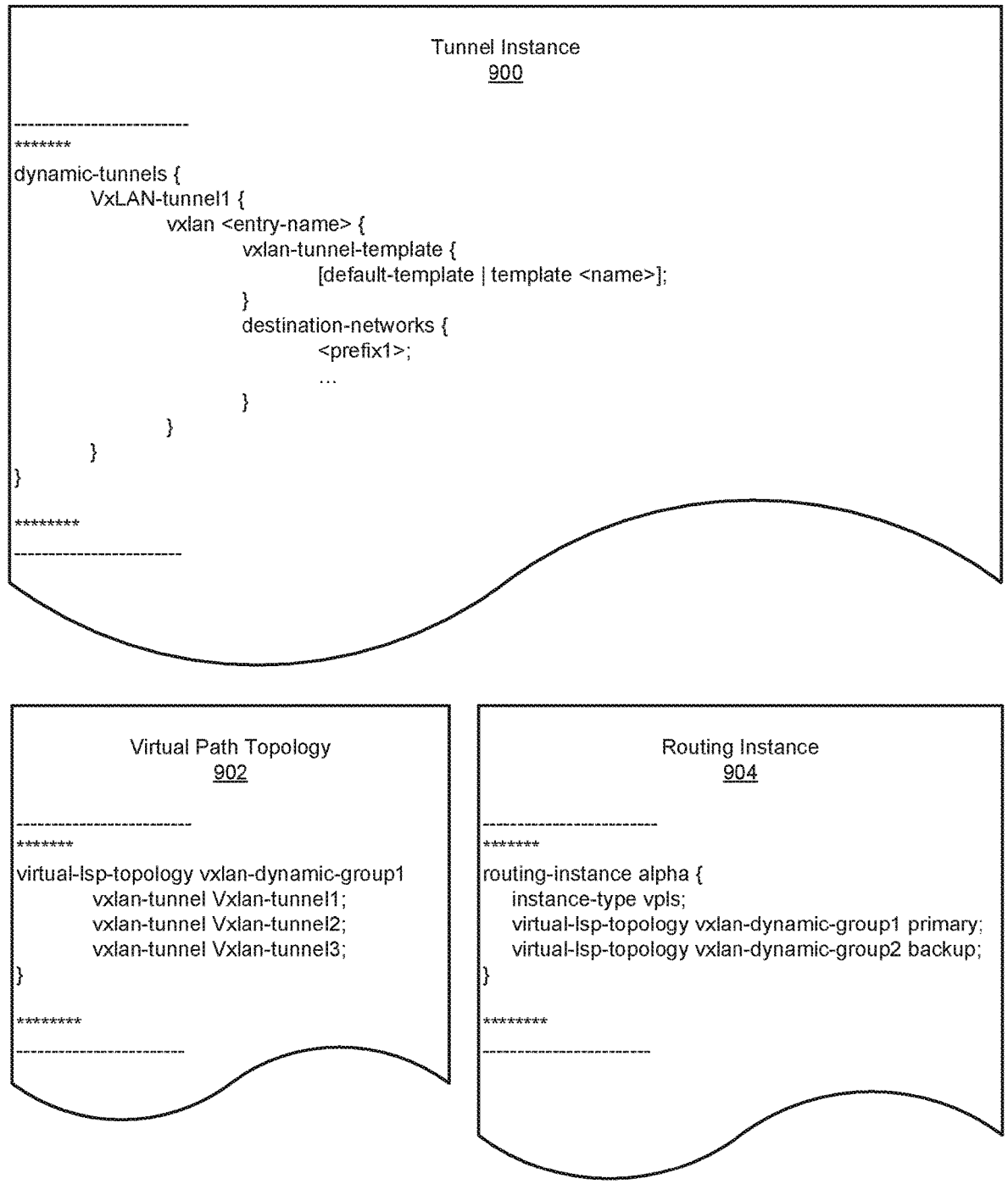
FIG. 9 is an illustration of an exemplary implementation of an additional service mapping.

FIG. 9 illustrates an exemplary implementation of a service mapping using dynamic VxLAN technology. As illustrated in FIG. 9, this exemplary implementation may include and/or represent a tunnel instance 900, a virtual path topology 902, and a routing instance 904. In this example, tunnel instance 900 may instantiate a specific tunnel (in this example, "dynamic-tunnels") that implements VxLAN technology. Virtual path topology 902 may include and/or represent a select grouping of VxLAN tunnels (in this example, "vxlan-tunnel Vxlan-tunnel 1", "vxlan-tunnel Vxlan-tunnel2," and "vxlan-tunnel Vxlan-tunnel3"). Similarly, routing instance 904 may instantiate a specific mapping (in this example, "routing-instance alpha") that defines the corresponding service type (in this example, "instance-type vpls"), the primary routing and/or tunneling option (in this example, "virtual-Isp-topology vxlan-dynamic-group1 primary"), and/or the backup routing and/or tunneling option (in this example, "virtual-Isp-topology vxlan-dynamic-group2 backup").

Figure 10:
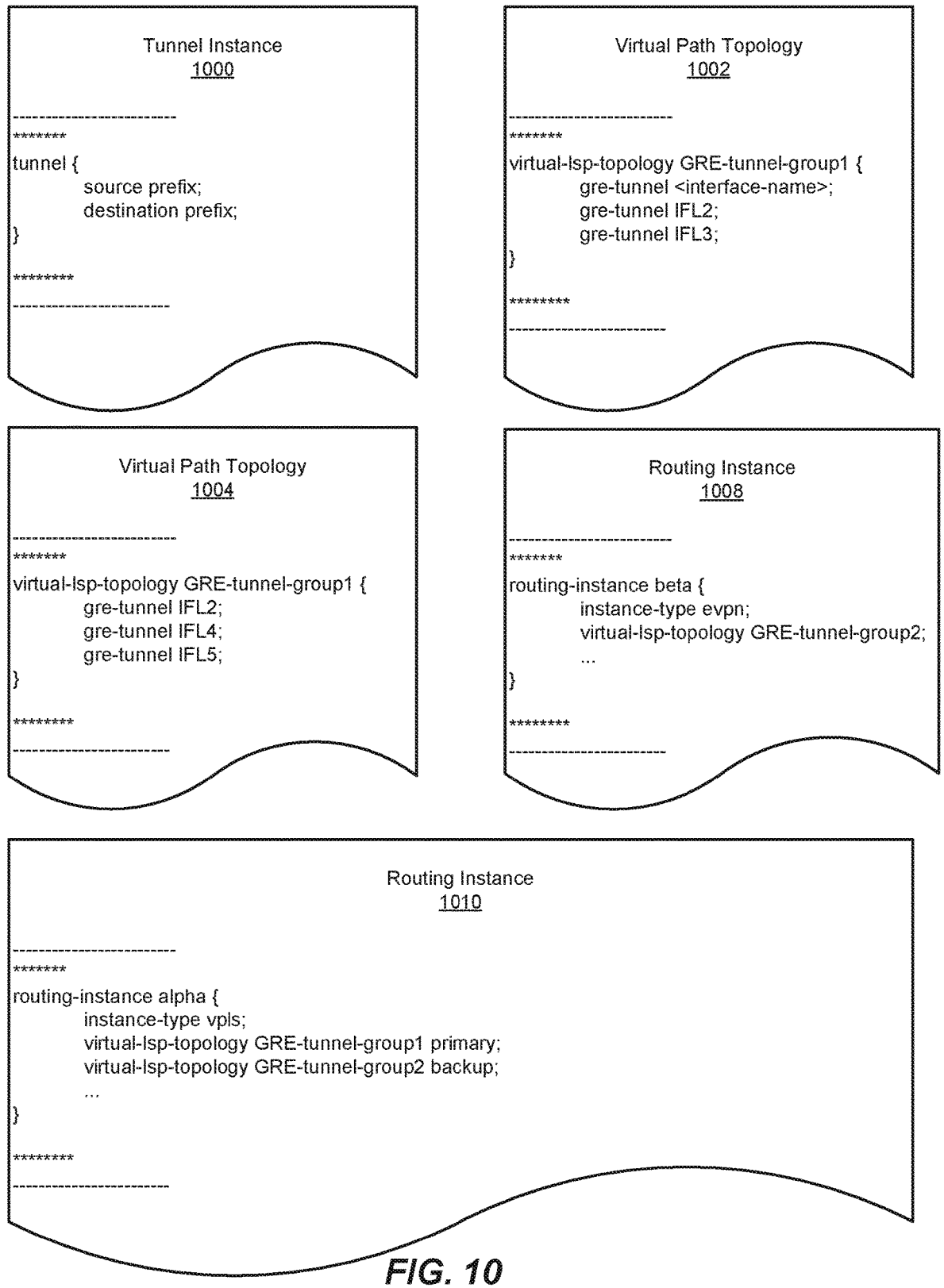
FIG. 10 is an illustration of an exemplary implementation of an additional service mapping.

FIG. 10 illustrates an exemplary implementation of a service mapping using GRE technology. As illustrated in FIG. 10, this exemplary implementation may include and/or represent a tunnel instance 1000, virtual path topologies 1002 and 1004, and routing instances 1008 and 1010. In this example, tunnel instance 1000 may instantiate a specific tunnel (in this example, "tunnel") that implements GRE technology. Virtual path topology 1002 may include and/or represent a select grouping of GRE tunnels (in this example, "gre-tunnel <interface-name>", "gre-tunnel IFL2," and "gre-tunnel IFL3"). Similarly, virtual path topology 1004 may include and/or represent a select grouping of GRE tunnels (in this example, "gre-tunnel IFL2," "gre-tunnel IFL4," and "gre-tunnel IFL5").

As illustrated in FIG. 10, routing instance 1008 may instantiate a specific mapping (in this example, "routing-instance beta") that defines the corresponding service type (in this example, "instance-type evpn") and the corresponding routing and/or tunneling option (in this example, "virtual-Isp-topology GRE-tunnel-group2"). Similarly, routing instance 1010 may instantiate a specific mapping (in this example, "routing-instance alpha") that defines the corresponding service type (in this example, "instance-type vpls"), the primary routing and/or tunneling option (in this example, "virtual-Isp-topology GRE-tunnel-group1 primary"), and/or the backup routing and/or tunneling option (in this example, "virtual-Isp-topology GRE-tunnel-group2 backup").

Figure 11:
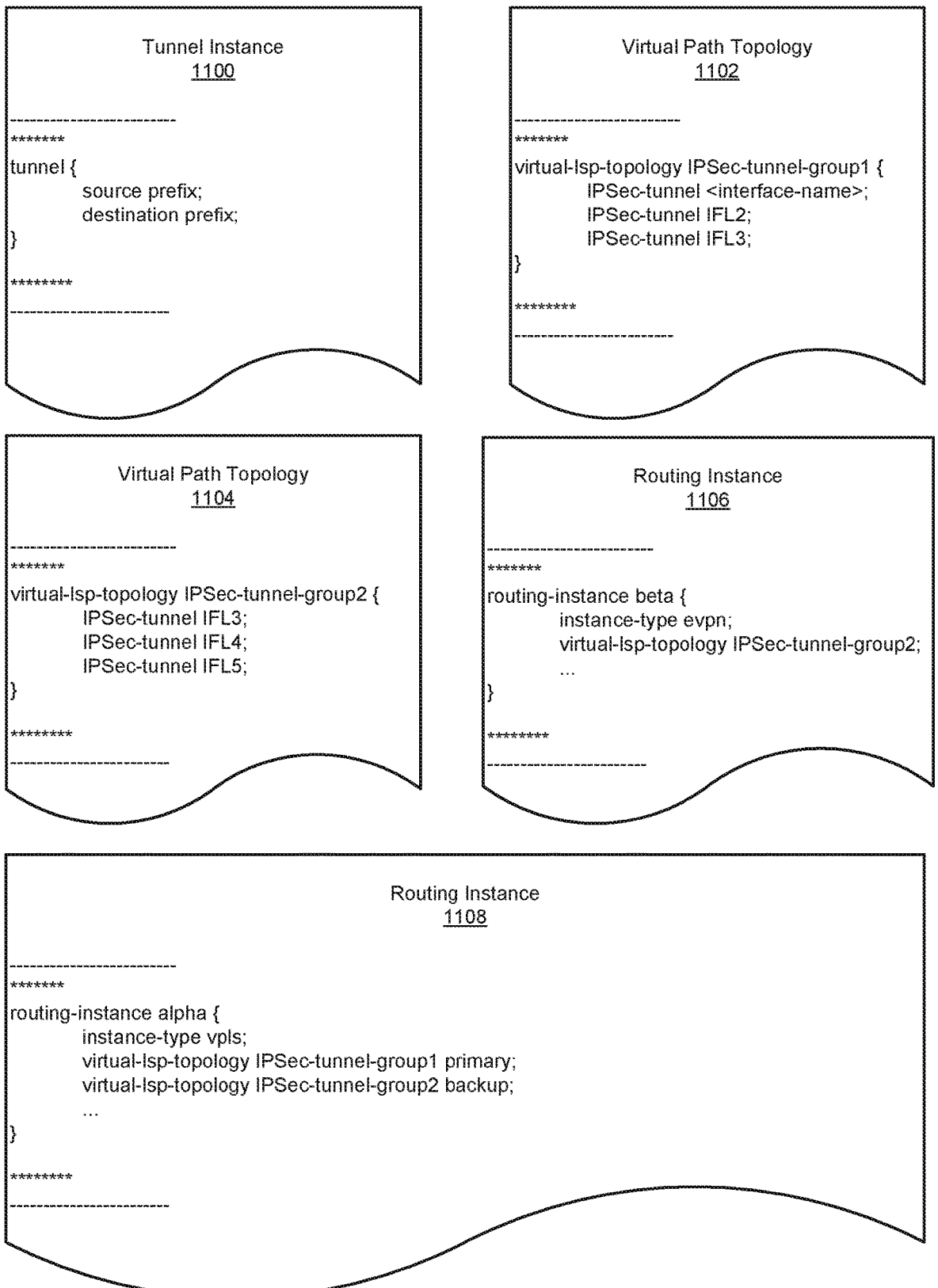
FIG. 11 is an illustration of an exemplary implementation of an additional service mapping.

FIG. 11 illustrates an exemplary implementation of a service mapping using IPSec technology. As illustrated in FIG. 11, this exemplary implementation may include and/or represent a tunnel instance 1100, virtual path topologies 1102 and 1104, and routing instances 1106 and 1108. In this example, tunnel instance 1100 may instantiate a specific tunnel (in this example, "tunnel") that implements IPSec technology. Virtual path topology 1102 may include and/or represent a select grouping of IPSec tunnels (in this example, "IPSec-tunnel <interface-name>", "IPSec-tunnel IFL2," and "IPSec-tunnel IFL3"), Similarly, virtual path topology 1104 may include and/or represent a select grouping of IPSec tunnels (in this example, "IPSec-tunnel IFL3," "IPSec-tunnel IFL4," and "IPSec-tunnel IFL5").

As illustrated in FIG. 11, routing instance 1106 may instantiate a specific mapping (in this example, "routing-instance beta") that defines the corresponding service type (in this example, "instance-type evpn") and the corresponding routing and/or tunneling option (in this example, "virtual-Isp-topology IPSec-tunnel-group2"). Similarly, routing instance 1108 may instantiate a specific mapping (in this example, "routing-instance alpha") that defines the corresponding service type (in this example, "instance-type vpls"), the primary routing and/or tunneling option (in this example, "virtual-Isp-topology IPSec-tunnel-group1 primary"), and/or the backup routing and/or tunneling option (in this example, "virtual-Isp-topology IPSec-tunnel-group2 backup").

Figure 12:
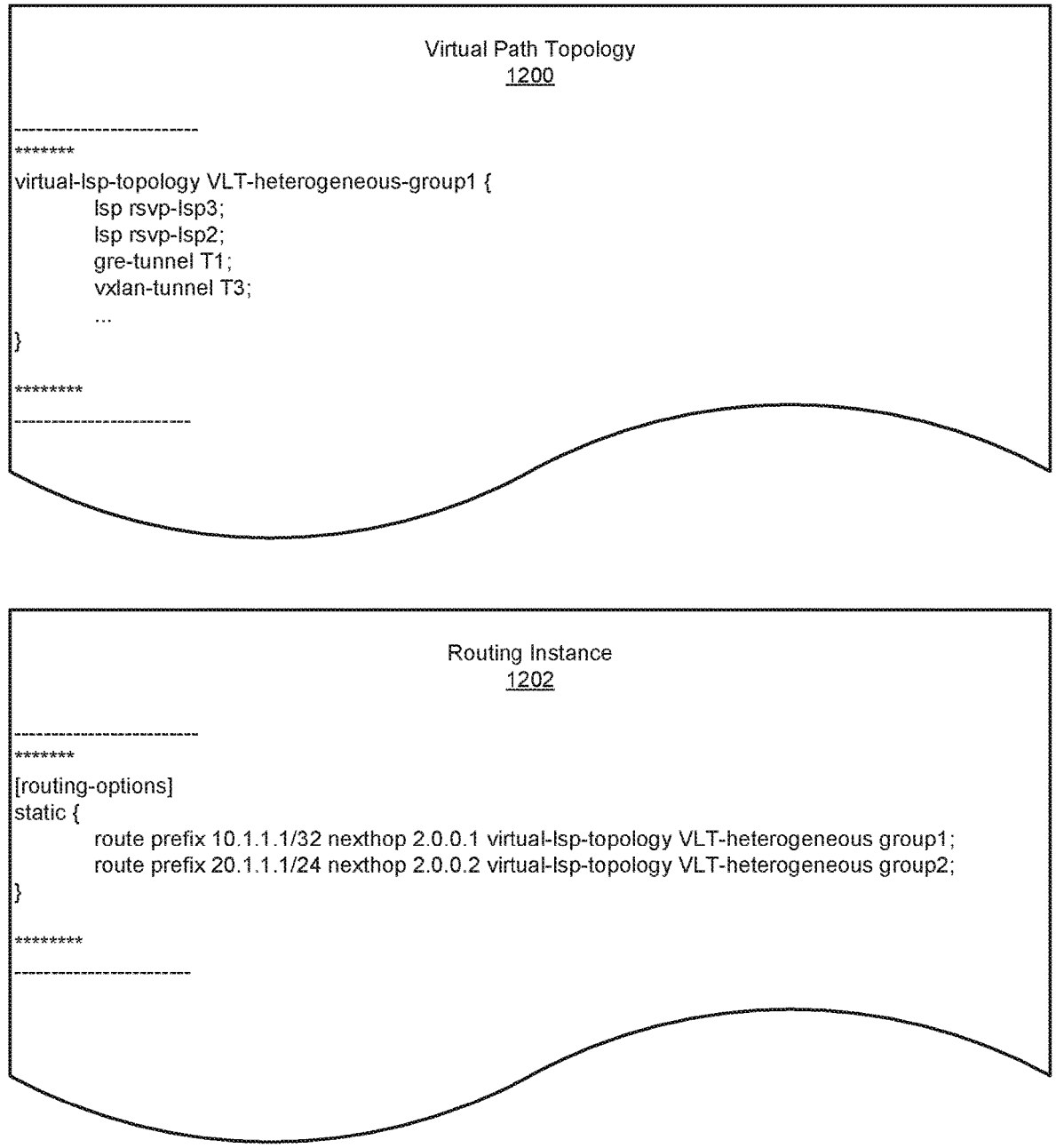
FIG. 12 is an illustration of an exemplary implementation of an additional service mapping.

FIG. 12 illustrates an exemplary implementation of a service mapping using IP over LSP technology. As illustrated in FIG. 12, this exemplary implementation may include and/or represent a virtual path topology 1200 and a routing instance 1202. In this example, virtual path topology 1200 may include and/or represent a select grouping of LSPs and/or transport tunnels (in this example, "Isp rsvp-Isp3", "Isp rsvp-Isp2," "gre-tunnel T1," and "vxlan-tunnel T3"). In addition, routing instance 1202 may instantiate certain static routing options (in this example, "route prefix 10.1.1.1/32 nexthop 2.0.0.1 virtual-Isp-topology VLT-heterogenous group1" and "route prefix 20.1.1.1/24 nexthop 2.0.0.2 virtual-Isp-topology VLT-heterogenous group2").

Figure 13:
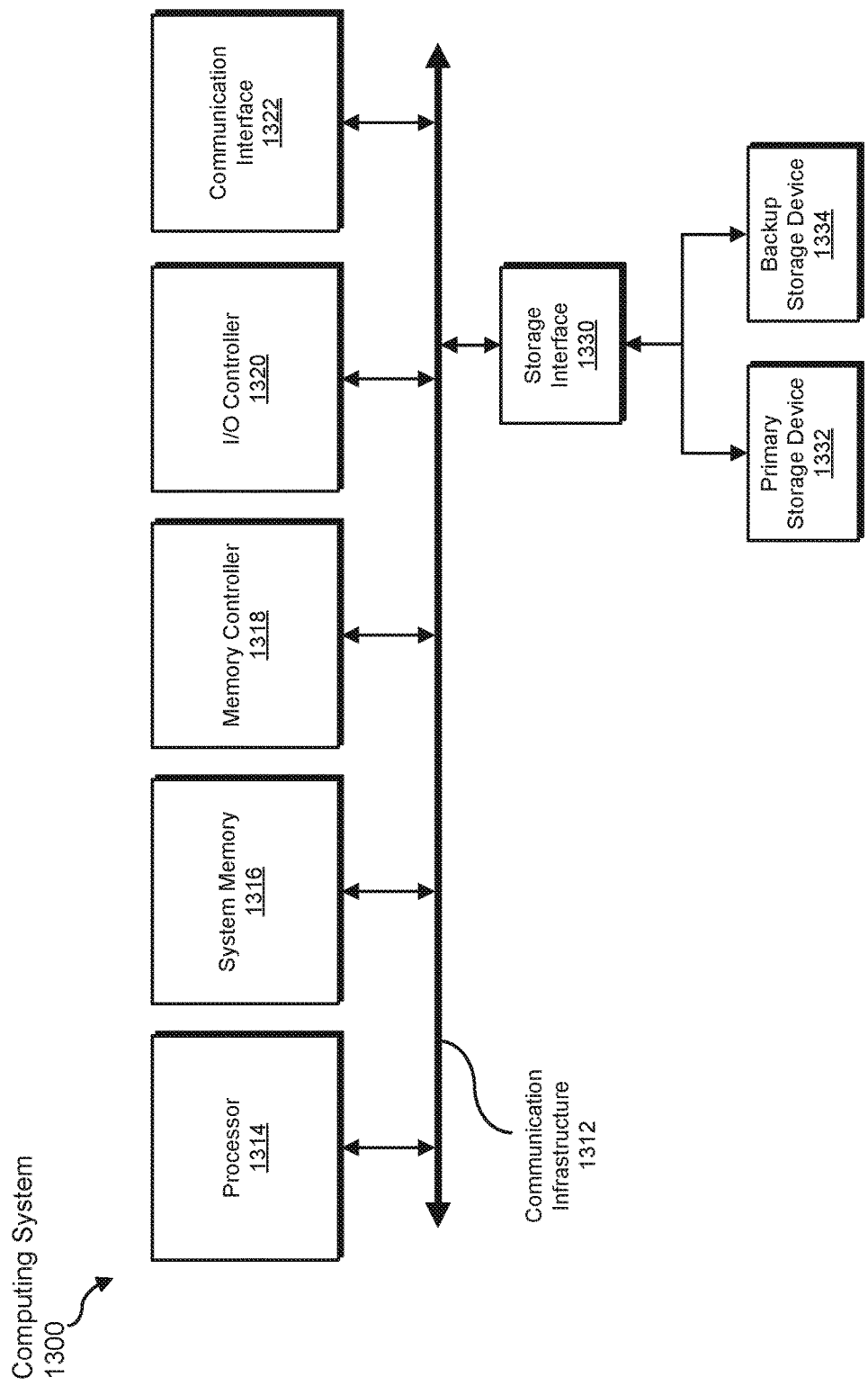
FIG. 13 is a block diagram of an exemplary computing system capable of implementing and/or being used in connection with one or more of the embodiments described and/or illustrated herein.

FIG. 13 is a block diagram of an exemplary computing system 1300 capable of implementing and/or being used in connection with one or more of the embodiments described and/or illustrated herein. In some embodiments, all or a portion of computing system 1300 may perform and/or be a means for performing, either alone or in combination with other elements, one or more of the steps described in connection with FIG. 3. All or a portion of computing system 1300 may also perform and/or be a means for performing and/or implementing any other steps, methods, or processes described and/or illustrated herein. In one example, computing system 1300 may include and/or store all or a portion of modules 102 from FIG. 1.

Computing system 1300 broadly represents any type or form of electrical load, including a single or multi-processor computing device or system capable of executing computer-readable instructions. Examples of computing system 1300 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 1300 may be programmed, configured, and/or otherwise designed to comply with one or more networking protocols. According to certain embodiments, computing system 1300 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 1300 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 1300 may include various network and/or computing components. For example, computing system 1300 may include at least one processor 1314 and a system memory 1316. Processor 1314 generally represents any type or form of processing unit capable of processing data or interpreting and executing instructions. For example, processor 1314 may represent an application-specific integrated circuit (ASIC), a system on a chip (e.g., a network processor), a hardware accelerator, a general purpose processor, and/or any other suitable processing element.

Processor 1314 may process data according to one or more of the networking protocols discussed above. For example, processor 1314 may execute or implement a portion of a protocol stack, may process packets, may perform memory operations (e.g., queuing packets for later processing), may execute end-user applications, and/or may perform any other processing tasks.

System memory 1316 generally represents any type or form of volatile or non-volatile storage device or medium capable of storing data and/or other computer-readable instructions. Examples of system memory 1316 include, without limitation, Random Access Memory (RAM), Read Only Memory (ROM), flash memory, or any other suitable memory device. Although not required, in certain embodiments computing system 1300 may include both a volatile memory unit (such as, for example, system memory 1316) and a non-volatile storage device (such as, for example, primary storage device 1332, as described in detail below). System memory 1316 may be implemented as shared memory and/or distributed memory in a network device. Furthermore, system memory 1316 may store packets and/or other information used in networking operations.

In certain embodiments, exemplary computing system 1300 may also include one or more components or elements in addition to processor 1314 and system memory 1316. For example, as illustrated in FIG. 13, computing system 1300 may include a memory controller 1318, an Input/Output (I/O) controller 1320, and a communication interface 1322, each of which may be interconnected via communication infrastructure 1312. Communication infrastructure 1312 generally represents any type or form of infrastructure capable of facilitating communication between one or more components of a computing device. Examples of communication infrastructure 1312 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 1318 generally represents any type or form of device capable of handling memory or data or controlling communication between one or more components of computing system 1300. For example, in certain embodiments memory controller 1318 may control communication between processor 1314, system memory 1316, and I/O controller 1320 via communication infrastructure 1312. In some embodiments, memory controller 1318 may include a Direct Memory Access (DMA) unit that may transfer data (e.g., packets) to or from a link adapter.

I/O controller 1320 generally represents any type or form of device or module capable of coordinating and/or controlling the input and output functions of a computing device. For example, in certain embodiments I/O controller 1320 may control or facilitate transfer of data between one or more elements of computing system 1300, such as processor 1314, system memory 1316, communication interface 1322, and storage interface 1330.

Communication interface 1322 broadly represents any type or form of communication device or adapter capable of facilitating communication between exemplary computing system 1300 and one or more additional devices. For example, in certain embodiments communication interface 1322 may facilitate communication between computing system 1300 and a private or public network including additional computing systems. Examples of communication interface 1322 include, without limitation, a link adapter, a wired network interface (such as a network interface card), a wireless network interface (such as a wireless network interface card), and any other suitable interface. In at least one embodiment, communication interface 1322 may provide a direct connection to a remote server via a direct link to a network, such as the Internet. Communication interface 1322 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 1322 may also represent a host adapter configured to facilitate communication between computing system 1300 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATH), Serial ATA (SATA), and External SATA (eSATA) host adapters, Fibre Channel interface adapters, Ethernet adapters, or the like. Communication interface 1322 may also enable computing system 1300 to engage in distributed or remote computing. For example, communication interface 1322 may receive instructions from a remote device or send instructions to a remote device for execution.

As illustrated in FIG. 13, exemplary computing system 1300 may also include a primary storage device 1332 and/or a backup storage device 1334 coupled to communication infrastructure 1312 via a storage interface 1330. Storage devices 1332 and 1334 generally represent any type or form of storage device or medium capable of storing data and/or other computer-readable instructions. For example, storage devices 1332 and 1334 may represent a magnetic disk drive (e.g., a so-called hard drive), a solid state drive, a floppy disk drive, a magnetic tape drive, an optical disk drive, a flash drive, or the like. Storage interface 1330 generally represents any type or form of interface or device for transferring data between storage devices 1332 and 1334 and other components of computing system 1300.

In certain embodiments, storage devices 1332 and 1334 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1332 and 1334 may also include other similar structures or devices for allowing computer software, data, or other computer-readable instructions to be loaded into computing system 1300. For example, storage devices 1332 and 1334 may be configured to read and write software, data, or other computer-readable information. Storage devices 1332 and 1334 may be a part of computing system 1300 or may be separate devices accessed through other interface systems.

Many other devices or subsystems may be connected to computing system 1300. Conversely, all of the components and devices illustrated in FIG. 13 need not be present to practice the embodiments described and/or illustrated herein. The devices and subsystems referenced above may also be interconnected in different ways from those shown in FIG. 13. Computing system 1300 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
    identifying a plurality of network paths within a network;
    identifying a plurality of network services offered via the network;
    creating a virtual path topology that represents a select grouping of the network paths that:
        originate from a single ingress node within the network; and
        lead to a plurality of egress nodes within the network;
    creating at least one additional virtual path topology that represents at least one additional select grouping of the network paths that:
        originate from the single ingress node within the network; and
        lead to the plurality of egress nodes within the network, wherein the select grouping of network paths differs from the additional select grouping of network paths;
    creating a virtual routing and forwarding instance that:
        maps at least one of the network services to the virtual path topology and the additional virtual path topology;
        defines transport logic among the network services, the virtual path topology, and the additional virtual path topology;
        implements the virtual path topology as a primary routing option; and
        implements the additional virtual path topology as a secondary routing option; and
    providing the at least one of the network services to at least one computing device via the virtual routing and forwarding instance.

2. The method of claim 1, wherein the plurality of network paths comprises at least one of:
    one or more label-switched paths represented by one or more labels; and
    one or more paths represented by one or more transport-layer routes.

3. The method of claim 2, wherein identifying the plurality of network paths comprises establishing the label-switched paths at the single ingress node.

4. The method of claim 1, further comprising:
    mapping at least one additional of the network services to the additional virtual path topology; and
    providing the at least one additional of the network services to at least one additional computing device via at least one of the network paths included in the additional select grouping represented by the additional virtual path topology.

5. The method of claim 1, wherein mapping the at least one of the network services to the virtual path topology comprises at least one of:

providing a many-to-many mapping of the network services to the virtual path topology and the additional virtual path topology; and providing a one-to-many mapping of the network services to the virtual path topology and the additional virtual path topology.

6. The method of claim 1, wherein the plurality of network services comprises at least one of:
   a Layer 2 circuit;
   a Layer 3 virtual private network;
   a Layer 2 virtual private network;
   a virtual private local area network service;
   an Ethernet virtual private network; and
   a next generation multicast virtual private network.

7. The method of claim 1, wherein the virtual path topology comprises at least one of:
   a Resource Reservation Protocol—Traffic Engineering tunnel;
   a dynamic Resource Reservation Protocol tunnel;
   a Label Distribution Protocol tunnel;
   a Segment Routing Interior Gateway Protocol tunnel;
   a Segment Routing Traffic Engineering tunnel;
   a Generic Routing Encapsulation tunnel;
   a Internet Protocol Security tunnel;
   a virtual extensible local area network tunnel;
   a Border Gateway Protocol Labeled Unicast tunnel;
   a Source Packet Routing in Networking tunnel; and
   an Internet Protocol tunnel.

8. A system comprising:
   an identification module, stored in memory, that:
      identifies a plurality of network paths within a network; and
      identifies a plurality of network services offered via the network;
   a creation module, stored in memory, that:
      creates a virtual path topology that represents a select grouping of the network paths that:
         originate from a single ingress node within the network; and
         lead to a plurality of egress nodes within the network;
      creates at least one additional virtual path topology that represents at least one additional select grouping of the network paths that:
         originate from the single ingress node within the network; and
         lead to the plurality of egress nodes within the network, wherein the select grouping of network paths differs from the additional select grouping of network paths;
      creates a virtual routing and forwarding instance that:
         maps at least one of the network services to the virtual path topology and the additional virtual path topology;
         defines transport logic among the network services, the virtual path topology, and the additional virtual path topology;
         implements the virtual path topology as a primary routing option; and
         implements the additional virtual path topology as a secondary routing option;
   a provisioning module, stored in memory, that provides the at least one of the network services to at least one computing device via the virtual routing and forwarding instance; and at least one physical processing device that executes the identification module, the creation module, and the provisioning module.

9. The system of claim 8, wherein the plurality of network paths comprises at least one of:
   one or more label-switched paths represented by one or more labels; and
   one or more paths represented by one or more transport-layer routes.

10. The system of claim 9, wherein the identification module establishes the label-switched paths at the single ingress node.

11. The system of claim 8, further comprising a mapping module, stored in memory, that maps at least one additional of the network services to the additional virtual path topology; and
   wherein the provisioning module provides the at least one additional of the network services to at least one additional computing device via at least one of the network paths included in the additional select grouping represented by the additional virtual path topology.

12. The system of claim 8, further comprising a mapping module, stored in memory, that does at least one of:
   providing a many-to-many mapping of the network services to the virtual path topology and the additional virtual path topology; and
   providing a one-to-many mapping of the network services to the virtual path topology and the additional virtual path topology.

13. The system of claim 8, wherein the plurality of network services comprises at least one of:
   a Layer 2 circuit;
   a Layer 3 virtual private network;
   a Layer 2 virtual private network;
   a virtual private local area network service;
   an Ethernet virtual private network; and
   a next generation multicast virtual private network.

14. A network device comprising:
   at least one storage device that stores a plurality of representations of label-switched paths within a network; and
   at least one physical processing device that is communicatively coupled to the storage device, wherein the physical processing device:
      identifies a plurality of network services offered via the network;
      creates a virtual path topology that represents a select grouping of the label-switched paths that:
         originate from a single ingress node within the network; and
         lead to a plurality of egress nodes within the network;
      creates at least one additional virtual path topology that represents at least one additional select grouping of the label-switched paths that:
         originate from the single ingress node within the network; and
         lead to the plurality of egress nodes within the network, wherein the select grouping of label-switched paths differs from the additional select grouping of label-switched paths;
      creates a virtual routing and forwarding instance that:
         maps at least one of the network services to the virtual path topology and the additional virtual path topology;

defines transport logic among the network services, the virtual path topology, and the additional virtual path topology;
implements the virtual path topology as a primary routing option; and
implements the additional virtual path topology as a secondary routing option; and provides the at least one of the network services to at least one computing device via the virtual routing and forwarding instance.

* * * * *